Patented Oct. 6, 1936

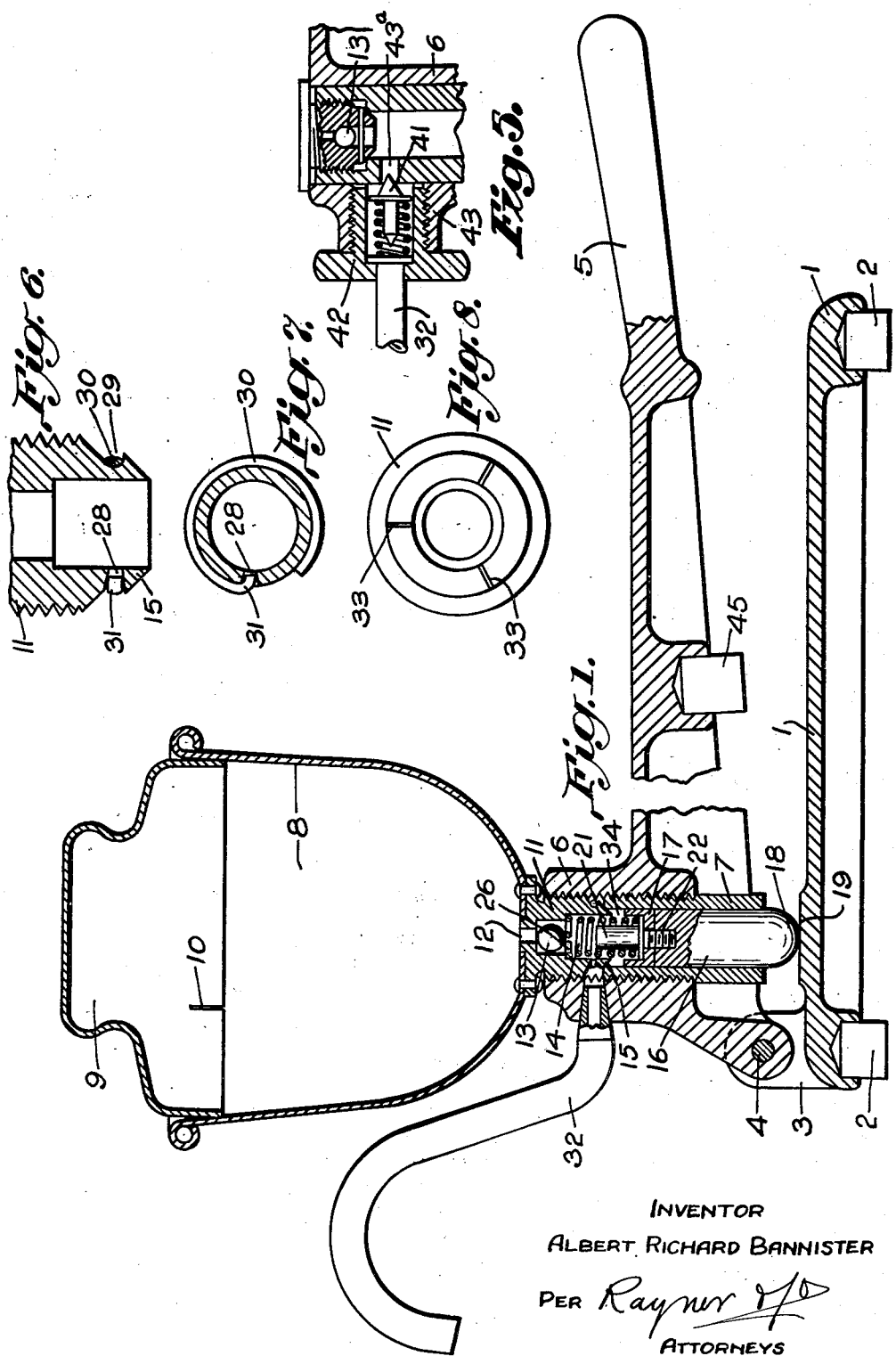

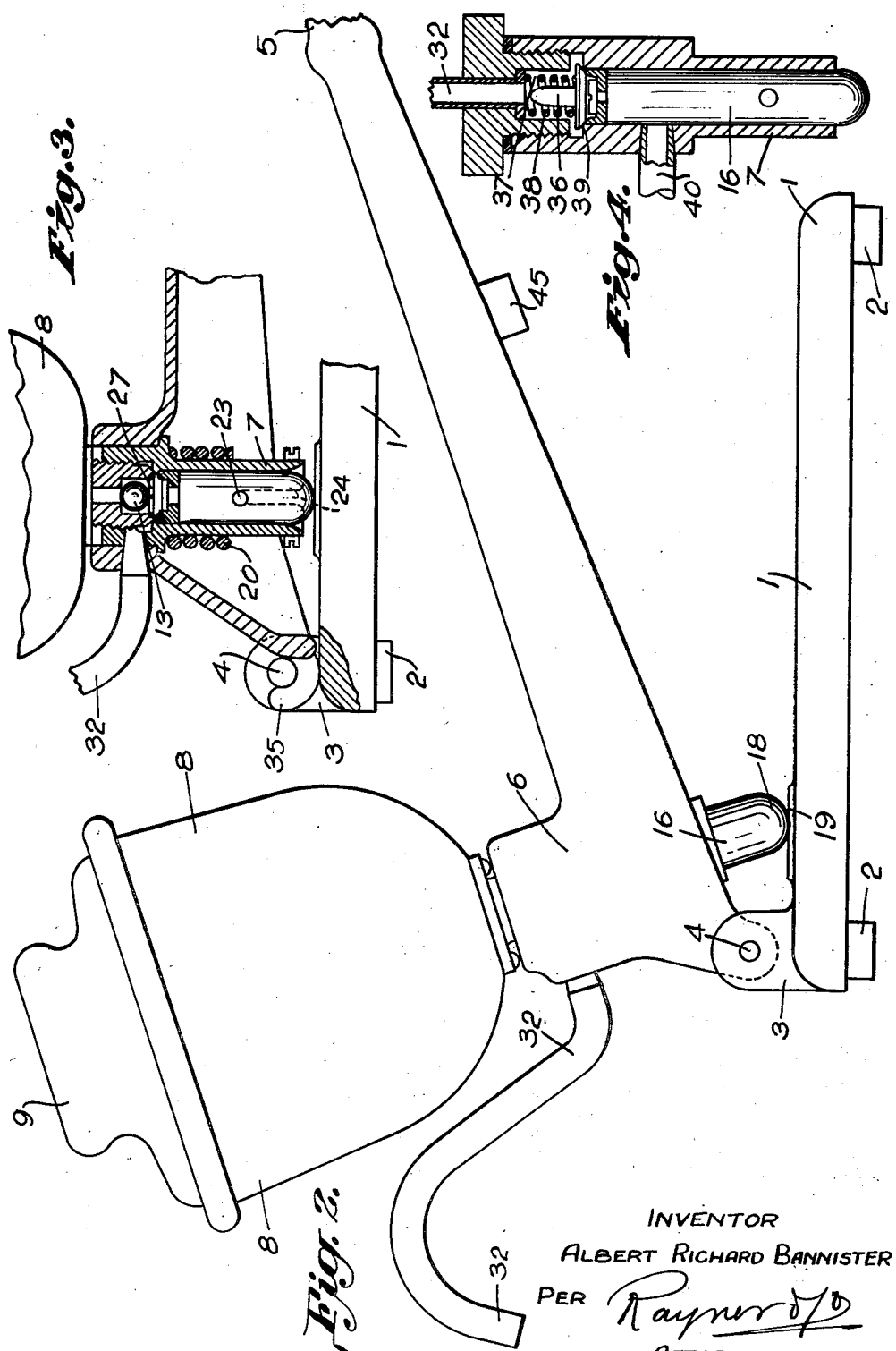

2,056,931

UNITED STATES PATENT OFFICE 2,056,931

APPARATUS FOR EMULSIFYING LIQUIDS

Albert Richard Bannister, Sunbury-on-Thames, England, assignor to British Emulsifiers Limited, Middlesex, England Application February 10, 1933, Serial No. 656,122
Renewed June 14, 1934. In Great Britain May 24, 1932

23 Claims. (Cl. 99—267)

This invention relates to simple form of apparatus for emulsifying liquids and it is useful for making artificial cream from melted butter and milk.

The object of the invention is to provide a simple, cheap and effective form of apparatus which will quickly produce an emulsion from a mixture of liquids and which can be easily cleaned and kept in a hygienic condition.

Broadly the present invention comprises a vessel to accommodate the substance to be emulsified and a pump and a handle for simultaneously oscillating said container and operating the pump, said pump extruding the liquid through a restricted passage.

One form of this invention comprises a pump and a container mounted as a unit and adapted to be oscillated about a hinge connection for the purpose both of agitating the mixture of liquids in the container and for forcing the mixture through a fine aperture under high pressure so as to produce the desired emulsion. The invention is primarily intended for making artificial cream from a mixture of melted butter and milk. The mixture is placed in the container from whence it is drawn by the pump which in turn forces it through a fine emulsifying aperture so that it is delivered in the form of artificial cream of any desired consistency. The whole apparatus may be mounted to oscillate about a hinge connection to a suitable base and be provided with a handle by which it may be oscillated about the hinge connection. By operating the handle the whole apparatus is oscillated about the hinge connection to effect the dual action of agitating the mixture and pumping it through the emulsifying aperture.

In order that my invention may be clearly understood and readily carried into effect I have appended hereto a sheet of drawings illustrating embodiments thereof and wherein:—

Fig. 1 is a sectional side elevation view showing the extrusion stage of operations.

Fig. 2 is a side elevation view showing the device in its normal condition.

Fig. 3 is a broken detail sectional side elevation view showing modified arrangement of spring for the plunger which extrudes the substance.

Figs. 4 and 5 are detail sectional views showing modified arrangements of valves.

Fig. 6 shows in detail sectional elevation the preferred form of valve for the extrusion orifice, and Fig. 7 is a sectional plan of the valve.

Fig. 8 is an inverted plan showing slits as an alternative to such a valve.

Referring to the drawings in Figs. 1 and 2 the device shown comprises a base 1 of metal or other suitable material which may be provided with small feet by which it may rest upon a table or other surface. Suitable rubber inserts 2 may be employed to form the feet and if desired a clamp may be arranged in order to secure the base to a table or the like. At one end of the base are brackets or a bifurcated lug 3 supporting a hinge pin 4 with which is pivotally supported one end of a casting or the like forming the handle 5 and main body 6 of the apparatus. This handle and body may conveniently be an aluminium or other casting and may be of substantially inverted U-shape in section with a conveniently rounded or tapered end to form the handle proper 5. In the combined body and handle is located a cylinder 7. This may be formed in one with the body or as shown may be a separate unit threaded into a cylindrical body part 6. The pin 4 about which the handle and body are adapted to oscillate is preferably horizontal and the axis of the cylinder 7 is preferably arranged in a substantially vertical position. In the upper end of the cylindrical body part 6 is fitted the container, bowl or vessel 8 for the liquids to be emulsified for example the mixture of melted butter and milk. The container may conveniently be a spun or cast aluminium vessel of any desired shape open at its top and provided with a removable or hinged lid or cover 9, which may also be shaped so as to be capable of use as a measure. The preferred form of cover is a cylindrical plug-in member as shown, a split 10 being formed in it to provide a certain amount of resiliency. The container 8 is provided with a screw-threaded projection 11 at its lower end adapted to be screwed into the upper open end of the cylindrical body part 6 and suitable packing can be provided to ensure an air and liquid tight joint between the base of the container and the top of the cylindrical body part 6. An aperture 12 leads from the base of the container through the screw-threaded projection into the upper end of the cylinder 7 and a suitable ball or other non-return valve 13 is located in this aperture so as to permit the mixed liquids to be drawn from the container into the cylinder and to prevent the return thereof. A suitable spring may be arranged to hold the ball or other non-return valve on to its seating. The lower end of the threaded projection 11 is coned as shown at 15 to seat closely in the top of the cylinder 7.

In the cylinder 7 is provided a piston or plunger 16. This may comprise a plain cylindrical plunger engaging freely in the cylinder and having a leather or other suitable cup washer 17 provided at its upper end to ensure a sliding liquid-tight joint with the walls of the cylinder 7. Any other suitable type of packing may be employed for this purpose. The lower end of the plunger is rounded or of substantially semispherical form as indicated at 18 and projects from the open lower end of the cylinder and rests upon a shallow boss or bearing surface 19 of the base. This portion which is raised from the general surface of the base may be of hardened or polished material. If desired the base may be of cast-iron or other suitable material with a raised boss at the required position, the surface of which is polished to receive the end of the plunger. The plunger is normally pressed downwardly by means of a spring 14 which surrounds an extension 21 on the top of the piston within the cylinder and this extension may form part of a screw 22 which serves to secure the cup washer. The spring 14 assists in creating turbulence as the mixture passes through its coils. The spring 14 forces the piston outwardly from the cylinder 7 whilst the downward pressure on the handle 5 will move the whole apparatus down relatively to the piston or plunger so as to compress the spring 14 which will in turn raise the cylinder turning the body and handle of the apparatus about its hinge connection when pressure on the handle is released. As shown in Fig. 3 a spring 20 surrounding the outside of the cylinder 7 and acting on a transverse pin 23 in the plunger and projecting through slots 24 in the cylinder may be employed as an alternative. The top of the spring 14 may be bent to provide a bar 26 (see Fig. 1) on which the ball valve 13 can rest or a similarly shaped ring 27 (see Fig. 3) can support the ball valve 13.

An emulsifying aperture may comprise a hole 28 (see Figs. 6 and 7) extending through the screw-threaded projection 11 into a peripheral groove 29 located above the conical face 15 at the end thereof. In this groove is a spring ring 30 preferably of noncorrosive material one end of which is turned inwardly to provide a valve 31 which is engaged in the hole 28, such hole preferably being coned or tapered to provide a seating. This spring ring acts as a valve which permits the mixture to pass under pressure to the discharge tube 32 and causes it to be emulsified and also acts as a non-return valve.

Another form of emulsifying aperture may be formed as shown in Fig. 8 by providing one or a number of recesses or cuts 33 in the conical lower end of the screw-threaded projection 11 on the base of the container where it engages against a seating in the cylinder, so that where the extension 11 engages against the seating at the top of the cylinder 7 a fine aperture or apertures will be left between it and the seating through which the mixture of liquids may be pumped when the handle is oscillated to cause relative movement between the piston and cylinder. A suitable outlet or delivery pipe 32 is of swan neck form as shown and is secured in an opening in the body 6 of the device and communicating with an annular space 34 formed between the lower end of the screw-threaded projection 11 and the top of the cylinder 7. This arrangement of slits 33 is contemplated in the embodiment shown in Fig. 3 which also shows a hook-shaped end 35 to the body part 6 to engage under the pin 4 thereby permitting easy removal of the body part for cleaning. An alternative form of emulsifying aperture may as shown in Fig. 4 consist in providing a small valve 36 of conical or ball shape arranged in a vertical outlet passage 37 from the cylinder to the delivery pipe 32. The valve may be arranged directly in the top of the cylinder and is held to its seating by a sufficiently strong spring 38 to ensure that it will lift only to a very small extent when the pump is operated so that the aperture between the valve and its seating 39 will be fine enough to ensure emulsification of the mixed liquids. An inlet passage 40 extends from the base of the vessel 8 to the side of the cylinder 7 which can be integral with the part 6. In another arrangement the valve may be arranged transversely in a detachable plug adapted to be screwed into the side of the body 6 as shown in Fig. 5, the valve being a spring loaded conical valve 41 and the said plug having a threaded milled or flanged headed member 42 threaded into a boss 43 on the body part 6. The conical end of the valve 41 seats in a small aperture 43 in the wall of the cylinder 7 and communicating with the upper end of the cylinder. This plug supports the outlet or delivery pipe 32 and may be readily removed to enable the valve and aperture to be cleansed. When the valve forming the emulsifying aperture is located at the top of the cylinder as shown in Fig. 4 then the inlet port from the container may be arranged in an inlet tube 43a at the side thereof. A suitable stop or buffer may be provided on the handle in the form of a rubber or other resilient plug 45 adapted to engage against the base to limit the downward movement of the handle. The piston or plunger 16 may also be provided with a simple spring or other catch to prevent it from becoming entirely detached from the cylinder but which may be easily released when it is desired to release the plunger for cleaning purposes.

In using my improved apparatus for the preparation of cream from a mixture of melted butter and milk by way of example, the milk and melted butter in the required proportions are mixed together, cooled to the desired temperature and poured into the container and the cover placed in position thereon. The handle is then alternately raised and lowered so as to cause the whole body of the device with the cylinder, plunger and container to oscillate about its hinge connection with the base. This causes a relative reciprocation between the cylinder and the plunger alternately drawing the mixed butter and milk from the container and forcing it out through the emulsifying aperture to the delivery pipe 32 where it will emerge in the form of rich cream of any desired consistency. The operation is extremely simple and rapid. For cleansing purposes it is only necessary to pump clean hot water through the apparatus but if desired the parts may be quickly disassembled for individual cleaning. Where the emulsifying aperture is formed between the end of the projection 11 on the container and the seating in the cylinder this can be readily cleared in the event of its becoming clogged by simply releasing the projection from its seating by turning the container and its screw-threaded end through a small angle of rotation and then again tightening it. Where a valve controls the emulsifying aperture this will be self-clearing as the valve will give way against the pressure of the liquid driven through it by the pump.

By the expression "axis" as applied to the substantially vertically inclined receptacle 8 of the present application, is meant a line drawn therethrough which passes substantially downwardly through the receptacle and then through the central portion of the pump combination formed by the piston 16 and the cylinder 7. By extending the bowl 8 to either side or by forming it of off-center shape, this axis of course may be caused to depart from the true center line of the bowl or receptacle 8, and such variations are intended to be included by the accompanying claims.

I claim:—

1. Apparatus for emulsifying liquids comprising a container for the liquid, a pump, a base member, a housing for such pump pivoted to said base member, a handle for oscillating the said housing extending from said housing, said container being carried by said housing and oscillated with it, means whereby oscillation of said housing actuates said pump, an inlet passage connecting the interior of said container to said pump and an extrusion passage from the pump for delivering the liquid from the pump in an emulsified condition.

2. Apparatus for emulsifying liquids comprising a reciprocating plunger pump, a liquid container carried by said pump receiving a plurality of liquid ingredients to be emulsified together, an operating handle for simultaneously reciprocating said plunger and causing a reciprocating agitation of the contents of said container, both reciprocations being of about the same magnitude and the reciprocation of the contents being sufficient to cause a thorough preliminary mixture of said contents, said reciprocation taking place by substantially vertical upward and downward strokes, the upward strokes constituting charge strokes for the pump and the downward strokes constituting discharge strokes for the pump, and automatic valving outlet from said container to said pump, a valve controlled outlet from said pump, and a discharge conduit extending from said outlet from the pump for discharging the emulsified liquid.

3. Apparatus for emulsifying liquids comprising a container adapted to receive the liquid to be emulsified, a pump secured to a base member, an outlet in said base communicating with said pump, a spring loaded reciprocating pump member depending from said housing, a base to which said housing is pivoted, means for oscillating said container and pump by hand, an outlet from said pump for discharging emulsified liquid, and an abutment with which is engaged said spring loaded pump member.

4. In apparatus for emulsifying liquids, a pump which extrudes liquid through a restricted orifice for emulsifying purposes, a non-return valve with said passage closed on the suction stroke of the pump and opened on the compression stroke, said valve comprising a resilient ring embracing part of the pump compression chamber and formed with a laterally directed end portion seated by the resiliency of the ring into said extrusion orifice so that it is opened by the pressure of the extruded liquids, a container for the liquid mounted above said pump and a valve controlled passage from said container to said pump, a body carrying said pump, a handle extending from said body for oscillating the container and simultaneously actuating the pump and a base plate to which said body is pivoted.

5. Apparatus for emulsifying liquids comprising a container for the liquid, a pump, a base member, a housing for such pump pivoted to said base member, a handle for oscillating the said housing and extending from said housing, said container being carried by said housing and oscillated with it, means whereby oscillation of said housing actuates said pump, an inlet passage connecting the interior of said container to said pump and an extrusion passage from the pump for delivering the liquid from the pump in an emulsified condition, and a cushioning member on said handle adapted to engage said base member.

6. In apparatus for emulsifying liquids, a pump which extrudes liquid through a restricted orifice for emulsifying purposes, a non-return valve with said passage closed on the suction stroke of the pump and opened on the compression stroke, said valve comprising a resilient ring embracing part of the pump compression chamber and formed with a laterally directed end portion seated by the resiliency of the ring into said extrusion orifice so that it is opened by the pressure of the extruded liquids, a container for the liquid mounted above said pump and a valve controlled passage from said container to said pump, a body carrying said pump, a handle extending from said body for oscillating the container and simultaneously actuating the pump and a base plate to which said body is pivoted, and a rubber cushion on said handle adapted to engage said base plate.

7. Apparatus for emulsifying liquids comprising a container for the liquids, a pump, a base member, a housing for such pump pivoted to said base member, a handle for oscillating the said housing extending from said housing, said container being carried by said housing and oscillated with it, means whereby oscillation of said housings actuates said pump, an inlet passage connecting the interior of said container to said pump and an extrusion passage for the pump for delivering the liquid from the pump in an emulsified condition.

8. Apparatus for emulsifying liquids comprising a container adapted to receive the liquid to be emulsified, a pump secured to a base member, an outlet in said base communicating with said pump, a spring loaded reciprocatory pump member depending from said housing, a base to which said housing is pivoted, means for oscillating said container and pump by hand, an outlet for said pump for discharging the emulsified liquid, and an abutment which is engaged by said spring loaded pump member.

9. Apparatus for emulsifying liquids comprising a container for the liquids, a pump cylinder depending from the base of said container, a spring loaded plunger reciprocating in said cylinder, an extension from said plunger depending from said cylinder, an abutment against which said extension is pressed, means for oscillating said container and cylinder, a one-way valve connecting the base of the container with the interior of the cylinder and a restricted extrusion orifice being located in said cylinder.

10. Apparatus for emulsifying liquids comprising a container for the liquid, a pump cylinder depending from the base of said container, a spring loaded plunger reciprocatory in said cylinder, an extension from said plunger depending from said cylinder, an abutment against which said extension is pressed, means for oscillating said container and cylinder, a one-way valve connecting the base of the container with the interior of said cylinder, and a restricted extrusion orifice being located in said cylinder, a depending extension at the base of said container, a body containing said cylinder and receiving said extension of the container, said receiving member being threaded on said latter extension, said means for oscillating the container being a handle connected to said body, a base carrying said abutment, the axis of said cylinder and pump being at an angle to the plane of said base and said body being pivoted to said base.

11. Apparatus for emulsifying liquids comprising a container for the liquid, a pump cylinder depending from the base of said container, a spring loaded plunger reciprocatory in said cylinder, an extension from said plunger depending from said cylinder, an abutment against which said extension is pressed, means for oscillating said container and cylinder, a one-way valve connecting the base of the container with the interior of said cylinder, a depending extension on the base of said container, a body containing said cylinder, and receiving said extension of the container, said one-way valve being located in said latter extension, said means for oscillating the container being a handle connected to said body, a base carrying said abutment, the axis of said cylinder and plunger being at an angle to the plane of said base and the said body being pivoted to said base, an extrusion tube fitted at one end into said extrusion orifice.

12. Apparatus for emulsifying liquids comprising a container for the liquid, a pump cylinder depending from the base of the said container, a spring mounted plunger reciprocating in said cylinder, an extension for said plunger depending from said cylinder, an abutment against which said extension is pressed, means for oscillating said container and cylinder, a one-way valve connecting the base of the container with the interior of said cylinder, and a restricted extrusion orifice being located in said cylinder, a depending extension at the base of said container, a body containing said cylinder, and receiving said extension of the container, said receiving member being located on said latter extension, said means for oscillating the container being a handle connected to said body, a base carrying said abutment, the axis of said cylinder and plunger being at an angle to the plane of said base and said body being pivoted to said base, a one-way valve in the extrusion orifice closing said orifice on the suction stroke of the pump and leaving a restricted passage on the compression stroke of the pump.

13. A homogenizer comprising a reservoir receptacle having a substantially vertically inclined axis, for receiving the materials to be homogenized, a restricted homogenizing outlet from said receptacle including a plunger pump with a cylinder and a piston for taking said materials from said receptacle and ejecting them through a homogenizing restriction, an actuating lever, and a mounting support for said lever, pump and receptacle, the axis of said pump being positioned to coincide with the axis of said receptacle and said lever crossing said axis and being pivotally mounted on said support beyond said axis.

14. A homogenizer comprising a reservoir receptacle having a substantially vertically inclined axis for receiving the materials to be homogenized, a restricted homogenizing outlet from said receptacle including a plunger pump with a cylinder and a piston for taking said materials from said receptacle and ejecting them through a homogenizing restriction, an actuating lever, and a mounting support for said lever, pump and receptacle, said lever partaking an up and down stroke movement and simultaneously causing an agitation of said materials in said receptacle and an ejection movement of said pump, the homogenizer being constructed so that the amplitude of the agitation movement and lever is substantially greater than plunger ejection movement, the agitation being effected by each stroke of the lever during the ejection stroke before the ejection commences, the axis of the pump converting with the axis of the receptacle.

15. A homogenizer comprising a reservoir receptacle having a substantially vertically inclined axis for receiving the materials to be homogenized, a restricted homogenizing outlet from said receptacle including a plunger pump with a cylinder and a piston for taking said materials from said receptacle and ejecting them through a homogenizing restriction, an actuating lever, and a mounting support for said lever, pump and receptacle, said receptacle taking the form of a rounded cup and the pump depending downwardly from the bottom of said cup and along the axis of said cup.

16. A homogenizer comprising a downwardly converging reservoir receptacle for receiving the materials to be homogenized, a restricted homogenizing outlet from the bottom of said receptacle including a plunger pump with a cylinder and a piston for taking said materials from said receptacle and ejecting them through a homogenizing restriction, an actuating lever, and a mounting support for said lever, pump and receptacle, said pump depending vertically downwardly, said receptacle and said lever crossing said pump and being pivotally mounted on said support beyond said pump.

17. A homogenizer comprising a reservoir receptable having a substantially vertically inclined axis for receiving the materials to be homogenized, a restricted homogenizing outlet from said receptacle including a plunger pump with a substantially vertical cylinder and a reciprocating plunger piston for taking said materials from said receptacle and ejecting them through a homogenizing restriction, an actuating lever connected to said receptacle adjacent its fulcrum, and a mounting support for said lever, pump and receptacle, said lever and plunger piston partaking an up and down stroke movement and simultaneously causing an agitation of said materials in said receptacle and an ejection movement of said pump, the homogenizer being constructed so that the amplitude of the agitation movement and lever is substantially greater than plunger ejection movement, the agitation being effected by each stroke of the lever during the ejection stroke before the ejection commences.

18. A homogenizer comprising a reservoir receptacle for receiving the materials to be homogenized, a restricted homogenizing outlet from said receptacle including a plunger pump with a cylinder and a piston for taking said materials from said receptacle and ejecting them through a homogenizing restriction, an actuating lever, and a mounting support for said lever, pump and receptacle, said receptacle taking the form of a rounded cup and the pump depending vertically downwardly from the bottom of said cup.

19. A manually operable household homogenizer which comprises a bowl to receive the liquid materials to be homogenized together, a pump including a cylinder and a plunger, said plunger and cylinder extending substantially vertically adjacent and below the bottom of said bowl, a restricted homogenizing outlet from said pump and operating means provided with a handle to simultaneously agitate and mix the contents of said bowl and reciprocate said plunger to cause said pump to admit the agitated mixture from said bowl and expel it through said restricted homogenizing outlet and a stand supporting said homogenizer, said homogenizing outlet including a bore opening into said cylinder, a threaded member concentric to and outside of said bore, a threaded cup to be screwed to said threaded member carrying a restricting element projecting into said bore, said threaded cup being provided with a roughened head to enable ready manual gripping and detachment and attachment thereof in respect to said threaded member.

20. A manually operable household homogenizer which comprises a bowl to receive the liquid materials to be homogenized together, a pump including a cylinder and a plunger, said plunger and cylinder extending substantially vertically adjacent and below the bottom of said bowl, a restricted homogenizing outlet from said pump and operating means provided with a handle to simultaneously agitate and mix the contents of said bowl and reciprocate said plunger to cause said pump to admit the agitated mixture from said bowl and expel it through said restricted homogenizing outlet, and a stand supporting said homogenizer, said operating member having an actuating extension extending diametrically across said bowl and provided with a pivotal mount alongside of said bowl, said extension being connected to cause said agitation by a substantially vertical reciprocating movement and said handle extending substantially horizontally outwardly from said bowl.

21. A manually operable household homogenizer which comprises a bowl to receive the liquid materials to be homogenized together, a pump including a cylinder and a plunger, said plunger and cylinder extending substantially vertically adjacent and below the bottom of said bowl, a restricted homogenizing outlet from said pump and operating means provided with a handle to simultaneously agitate and mix the contents of said bowl and reciprocate said plunger to cause said pump to admit the agitated mixture from said bowl and expel it through said restricted homogenizing outlet, and a stand supporting said homogenizer, said cylinder being provided with an inlet opening in its side intermediate its ends from said bowl, one end of said cylinder being closed by said restricted homogenizing outlet and the other end being closed by the insertion of said plunger, said plunger in its reciprocating movement alternately cutting off and opening said side inlet opening.

22. A homogenizer comprising a bowl to receive the liquid materials to be homogenized, a pump cylinder extending substantially vertically from the bottom of said bowl at the bottom thereof, a plunger extending vertically within said cylinder and closing one end of said cylinder, an outlet port connection from said cylinder including a homogenizing restriction, and means for reciprocating said plunger within said lever, said last-mentioned means including a lever connected to said bowl and pivotally mounted at one side of said bowl, and extending diametrically across and beyond said bowl, said extension beyond said bowl being formed as a handle to enable manual reciprocation of said plunger.

23. A homogenizer comprising a bowl to receive liquid materials to be homogenized, a pump cylinder having an inlet port from said bowl, a plunger in said cylinder enclosing one end of said cylinder, an outlet port connection from said cylinder including a homogenizing restriction device, and means for reciprocating said plunger within said cylinder and for causing agitating movement of the materials to be homogenized substantially of about the same magnitude.

ALBERT RICHARD BANNISTER.